(No Model.)
G. W. SEAVERNS.
PIANOFORTE ACTION.
No. 489,615. Patented Jan. 10, 1893.
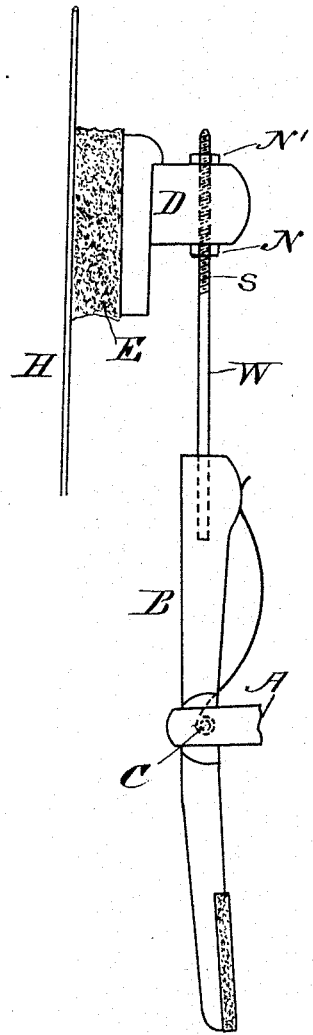
WITNESSES
Frank G. Parker
William Edson
INVENTOR
George W. Seaverns.

UNITED STATES PATENT OFFICE.

GEORGE W. SEAVERNS, OF CAMBRIDGE, MASSACHUSETTS.

PIANOFORTE-ACTION.

SPECIFICATION forming part of Letters Patent No. 489,615, dated January 10, 1893.

Application filed October 3, 1892. Serial No. 447,685. (No model.)

*To all whom it may concern:*

Be it known that I, GEORGE W. SEAVERNS, of Cambridge, in the county of Middlesex and State of Massachusetts, have invented a new and useful Improvement in Pianoforte-Actions, of which the following, taken in connection with the accompanying drawing, is a specification.

My invention relates to a new method of attaching damper blocks to damper levers and consists in attaching the block to a screw-threaded wire, said wire passing freely through the block and being provided with screw nuts, one at each side of said block and adapted to hold it firmly and adjustably in place.

The damper block is attached near to one end of the screw-threaded wire, the other end of the wire is driven firmly into a suitably shaped piece of wood; the wire and the piece of wood together form the damper lever, substantially like those in common use.

The exact construction of my device may be best understood by reference to the accompanying drawing which shows in side elevation a damper lever and damper, the block of which is attached by my method.

Referring to the drawing, let A represent a damper flange of any suitable style and construction, and supporting by a pivot C the wood part B of a damper lever. To the upper end of the part B, I attach a wire W, the lower end of the wire being driven into the upper end of the part B as shown. The wire W has a screw thread S cut on the upper end and is provided with two screw nuts N and N'. The damper block D has a vertical hole through it made large enough to admit the wire W to pass freely through it. The nuts N, N' when screwed against the end of the block D, firmly hold it in place and admit of an adjustment of the block D on the wire W. The damper block D is provided with the usual felt pad E.

Having described my device, what I consider as new and wish to patent is set forth in the following claim.

In a piano forte action, the combination of the screw threaded wire W, having two screw nuts N, N' adapted to adjustably hold the damper block D: with the damper block D, substantially as and for the purpose set forth.

GEORGE W. SEAVERNS.

Witnesses:
FRANK G. PARKER,
WILLIAM EDSON.